Feb. 3, 1953          J. W. POULTER          2,627,169
METHOD OF PRODUCING STABILIZATION IN SOIL MASSES
Filed July 15, 1946          3 Sheets-Sheet 1
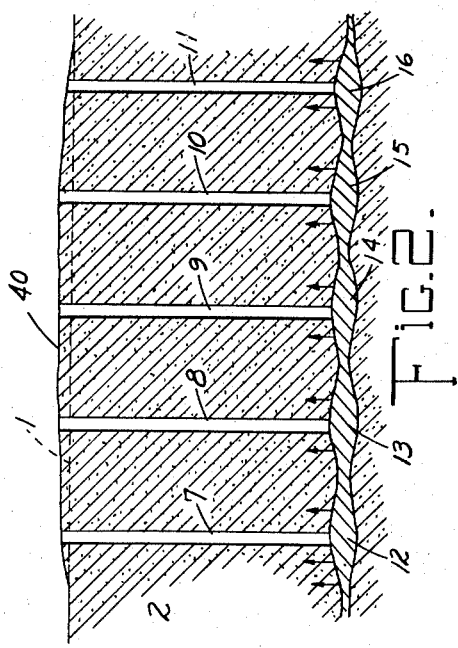
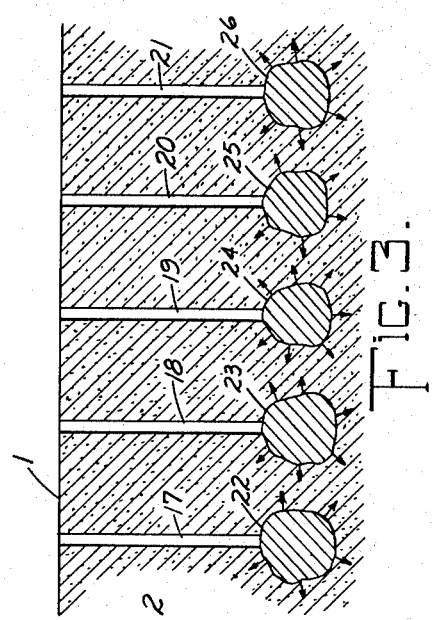
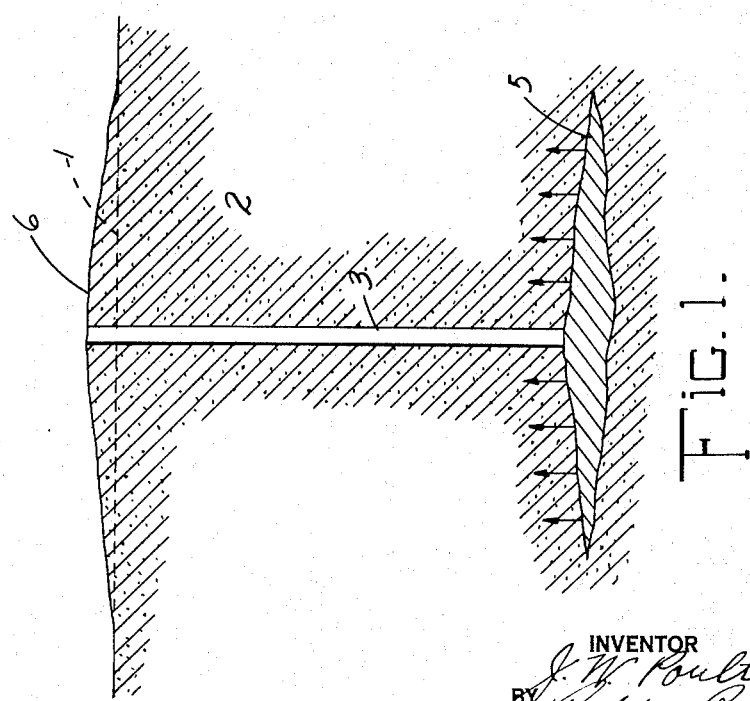
INVENTOR
J. W. Poulter
BY
Robbs Cook
ATTORNEYS Feb. 3, 1953  J. W. POULTER  2,627,169
METHOD OF PRODUCING STABILIZATION IN SOIL MASSES
Filed July 15, 1946  3 Sheets-Sheet 2
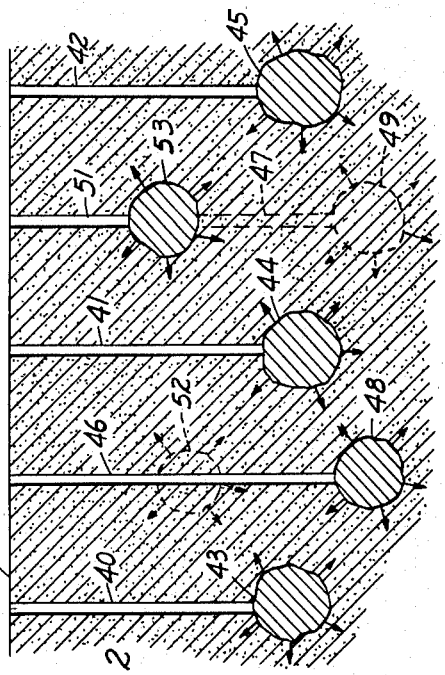
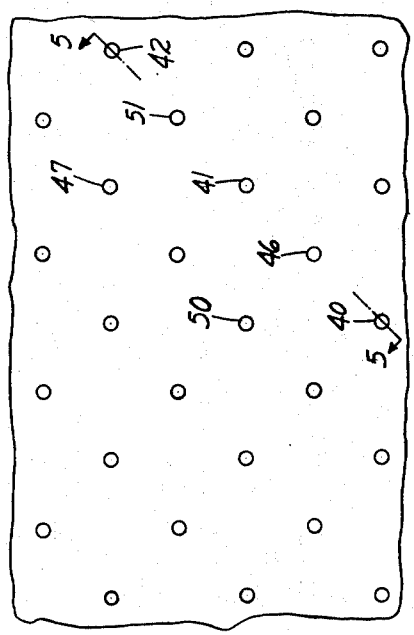
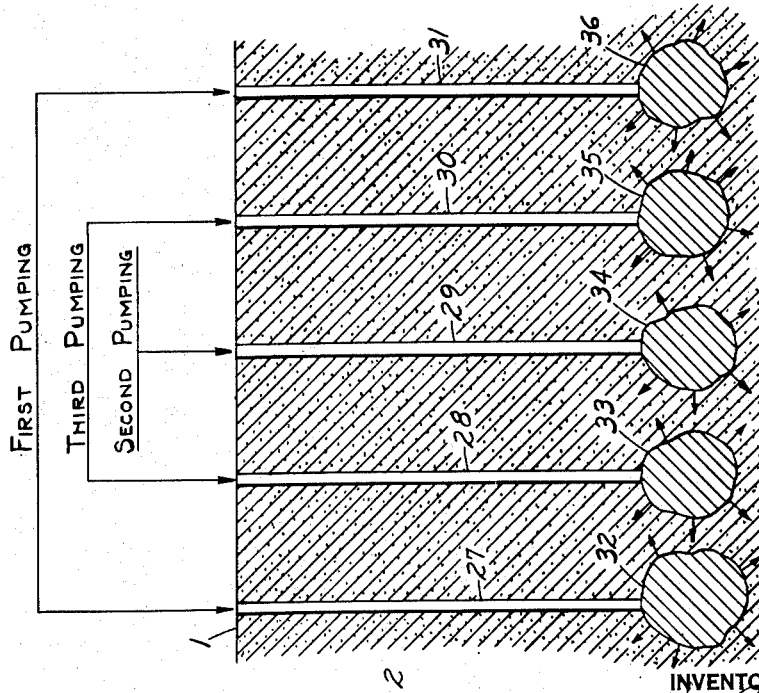
INVENTOR
J. W. Poulter
BY Robb & Robb
ATTORNEYS

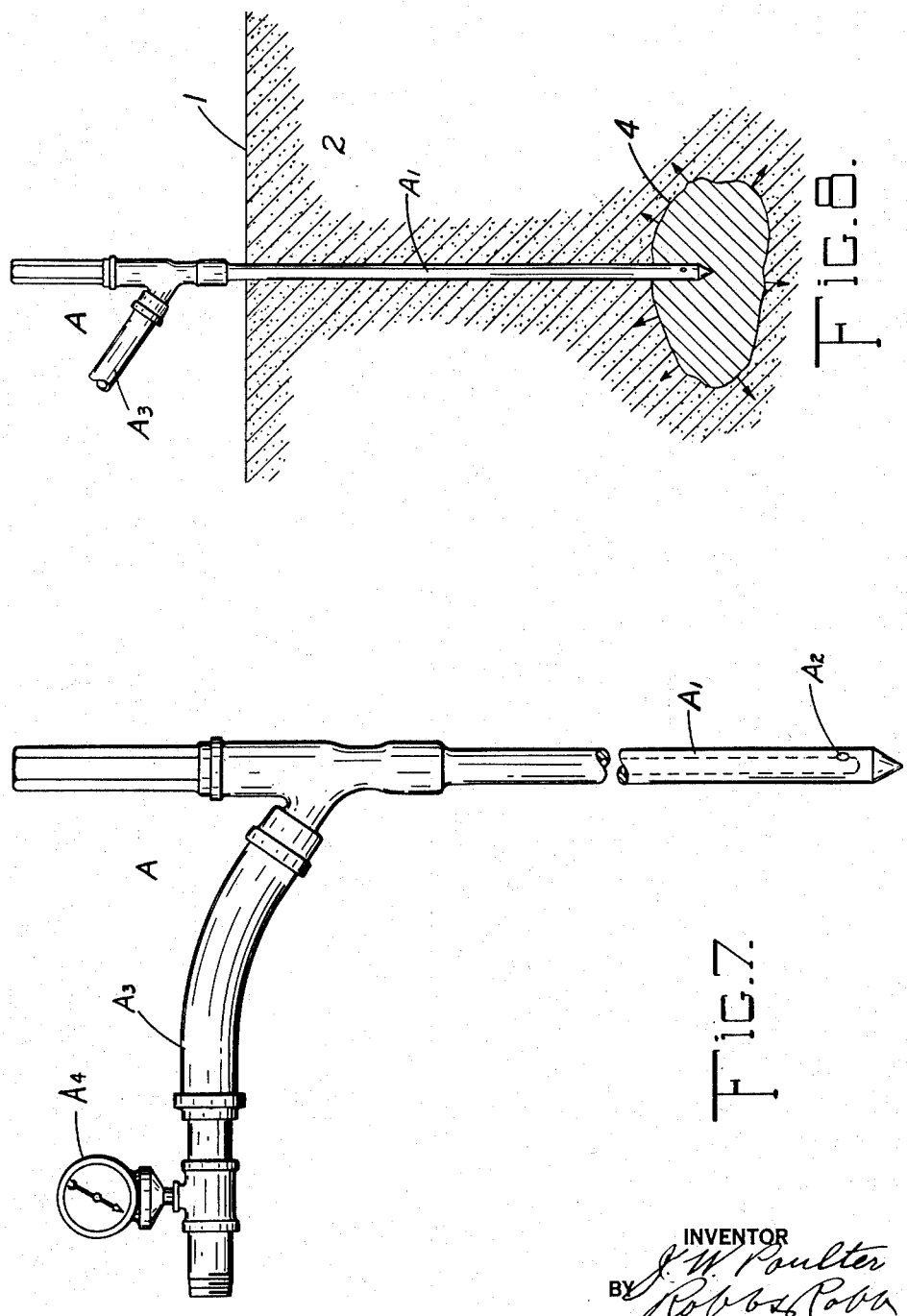

Patented Feb. 3, 1953

2,627,169

UNITED STATES PATENT OFFICE 2,627,169

METHOD OF PRODUCING STABILIZATION IN SOIL MASSES

John W. Poulter, Milwaukee, Wis., assignor to Koehring Company, Milwaukee, Wis., a corporation Application July 15, 1946, Serial No. 683,589

2 Claims. (Cl. 61—35)

My present invention relates to stabilization of soil masses, and more particularly comprises novel methods for treating soil masses beneath the surface of the earth upon which earth supported structures have been or are to be built, the methods of my invention having as their purpose or object to produce stability or to improve stability of such soil masses with a view to preventing settling and disintegration of the earth supported structures thereabove.

It has long been observed that the nature of soil masses beneath the earth surface is by no means uniform in reference to stability thereof. This is due in part, of course, to the different composition of soil in different places beneath the earth surface, but in large measure, the instability is due to the presence of voids or cavities, fissures, or crevices, as well as to varying degrees of porosity of the soil. The moisture content of the soil varies with the different conditions thereof, and the larger the percentage of moisture, whether contained in actual crevices or fissures or in subterranean cavities or voids, or in the normal pores of the soil, the greater is the instability thereof.

The condition of stability of the soil is highly important in reference to earth supported structures thereabove, whether such structures be buildings, or road pavements of various types, or railway roadbeds. The instability of the soil causes sinking or settling of the earth supported structures with cracking and consequent disintegration thereof, creating problems to which a great deal of attention has been given in reference to both the prevention and the curing of such conditions.

For the raising of sinking or settling earth supported structures, and also for the stabilization treatment of soil masses, it has been heretofore proposed to force into the soil beneath the earth surface a mobile and substantially incompressible fluid having cementitious characteristics, in the manner and for the purposes indicated, for example, in my own prior Patent No. 2,363,018 issued November 21, 1944, and in the patent of Fiock, No. 1,943,914, issued January 16, 1934.

My present invention contemplates the introduction of a mobile cementitious fluid into soil masses beneath the surface thereof in such a manner as to produce localized pressure areas having pressures greater than that produced by the weight of the soil mass above the same. To this end the method of my invention comprises the introduction into soil masses of a mobile cementitious fluid material in a quantity approximating that required to cause slight bulging of the earth surface above the point of introduction of said fluid material, or to cause slight leakage of the cementitious material to the earth's surface. My invention contemplates the use of a cementitious material which will harden and set sufficiently solid to maintain the pressure produced at the localized zone of introduction thereof into the soil.

My invention further contemplates the introduction of a mobile cementitious material in fluid condition into the soil mass at adjacent points or zones whose spheres of pressure influence are normally interactive, in such a manner as to prevent undesired conjoint action of the separate fluid masses introduced at said adjacent points in the soil. To this end the method of my invention contemplates a time interval between the separate introduction of the cementitious fluid at adjacent points in the soil whose spheres of pressure influence are normally interactive, whereby to permit hardening of the cementitious mixture in localized areas at said adjacent points and to permit further compaction effect upon soil adjacent the first zone of introduction of cementitious material before introduction of said material at an adjacent one of said zones.

The methods of my invention herein disclosed aim to produce localized areas or zones of pressure beneath the soil close to one another and having pressures greater than that produced by the weight of the soil thereabove, and serving to compact the soil and drive out moisture therefrom, whereby to produce stabilization of, or to increase the stabilization characteristics of the soil so treated.

Other objects, advantages, and features of the invention will become apparent from the following detail description, in conjunction with the accompanying drawings, in which:

Figure 1 is a vertical sectional view of earth, illustrating diagrammatically a condition in which the introduction of material to soil mass has caused a general lifting of the soil above resulting in widening of the pressure area with reduction of pressure thereat.

Figure 2 is a vertical sectional view of earth, illustrating diagrammatically a condition in which the pressure effects of fluid masses separately introduced at adjacent points in the soil beneath the earth surface have combined or cooperated to produce by their conjoint action a general lifting of the soil at the earth surface thereabove.

Figure 3 is a sectional view of earth illustrating diagrammatically the introduction of fluid masses into the soil beneath the earth surface, in accordance with my invention, in such a manner as to produce localized pressure areas.

Figure 4 is a vertical sectional view of earth illustrating diagrammatically the method of introduction of fluid masses into the soil beneath the earth surface, in accordance with my invention, in separate stages with time intervals between to permit hardening of the fluid masses and further compaction effect upon adjacent soil.

Figure 5 is a vertical sectional view of earth on line 5—5 of Figure 6, illustrating the introduction of fluid masses into the soil beneath the earth surface at different depths, in accordance with my invention, in such a manner as to prevent conjoint action of the fluid masses at adjacent zones to effect soil compaction throughout a considerable depth thereof.

Figure 6 is a plan view illustrating a uniform pattern of distribution of holes for the introduction of mobile cementitious fluid into the soil beneath the earth surface, in accordance with my invention.

Figure 7 is an elevation of a nozzle unit provided with a pressure gauge and adapted to facilitate introduction of mobile cementitious fluid into the soil below the earth surface, in accordance with the methods of my invention.

Figure 8 is a view showing the nozzle unit of Figure 7 inserted into a section of earth to introduce cementitious fluid into the soil beneath the earth surface.

Referring to the drawings, the numeral 1 indicates the normal surface of the earth, and the numeral 2 indicates the soil mass below the earth surface, throughout the drawings. For the purpose of creating pressure areas in the soil beneath the earth surface, a suitable hole may be drilled in the earth, as indicated at 3 in Figure 1, and into this hole the pointed stem A1 of a nozzle unit such as A, illustrated in Figures 7 and 8, may be inserted, so that its bottom outlet opening A2 is positioned in the area of the soil at which pressure is desired to be produced. The pointed stem A1 may, if desired, be driven into the soil. Then a cementitious fluid mixture or slurry is pumped into the hollow stem A1 of the nozzle unit A through a conduit A3 from a machine of the type indicated in my prior Patents 1,929,215 and 2,368,568. For the purposes of my present invention, the cementitious mixture or slurry, commonly referred to as mud, may comprise an admixture of soil with a suitable binder such as Portland cement, or light asphalt, or asphaltic oil, or similar bituminous material, and water, in the proportion of about 30 to 50 pounds of water per 100 pounds of the other materials. The mixture is preferably of such a consistency as to be readily fluid so that it can be pumped through the conduit and stem A1 of the nozzle unit A. The mix may contain some sand but must be sufficiently free from harshness that it can be pumped through the equipment without clogging. The mixture should be of such a nature that it will set to produce a sufficiently stable mass to prevent flow or distortion under the soil loadings. The intent is to build up higher pressure zones rather than filling the very small voids, and therefore, the consistency of the slurry can be heavier or stiffer than that previously used for other purposes. Because of this the water content may be relatively less. This can only be determined by tests with each particular mix and the condition of the soil being treated. One example of a suitable slurry may comprise the following:

| | Pounds |
|---|---|
| Fine sand | 68 |
| Soil (silt or clay loam) | 20 |
| Portland cement | 12 |

Mixed into a slurry with from 30 to 50 lbs. of water per one hundred pounds of about materials.

Now referring to Figure 3, 4, 5, 6, and 8 particuarly, it is the purpose of my invention to introduce the cementitious fluid mixture or slurry into the soil 2 below the earth surface 1 in such a manner as to produce localized areas or zones of pressure such as indicated by the fluid mass 4 in Figure 8, having a pressure greater than the pressure exerted by the weight of the soil above the fluid mass 4. If the pressure zone or area produced in the soil beneath the earth surface is localized in the manner indicated by the mass 4 in Figure 8, an improved stabilization effect upon the soil of that area is obtained by compaction of the soil and squeezing out of moisture in that area.

In accordance with my invention, there are several methods of controlling introduction of mobile cementitious fluid into the soil beneath the earth surface in order to obtain the desired effect. The methods of my invention contemplate controlling the amount of cementitious fluid mixture introduced into a particular zone or area of the soil, and controlling the manner of introduction of cementitious fluid mixture into the soil at adjacent zones whose spheres of pressure influence will normally interact so that the pressure effects created by fluid masses in adjacent areas of the soil will not act conjointly to produce a general lifting of the soil thereabove.

If the introduction of mobile fluid into the soil beneath the earth surface causes any material lifting of the soil at the earth surface thereabove, a special object of the invention will be largely defeated, because this would permit a widening of the pressure area in the soil as indicated at 5 in Figure 1 such that the pressure exerted by the fluid mass 5 on the adjacent soil is only equal to the soil pressure above, or the same as it was before pumping was started, it being noted that in the condition illustrated in Figure 1 the pumping of mobile fluid into the zone or area indicated at 5 has continued until the soil of the earth surface has been lifted above the normal earth surface designated by the dotted line indicated by the numeral 1 until the earth surface now occupies the position indicated by the line designated 6.

A similar condition is illustrated by Figure 2 wherein a number of holes designated by numerals 7, 8, 9, 10 and 11 have been drilled into the earth to the same depth and relatively close together. The bottom extremities of adjacent holes in Figure 2, such as 7 and 8, or 8 and 9, or 9 and 10, or 10 and 11, are in adjacent zones whose spheres of pressure influence are normally interactive, i. e., zones at which the creation of given pressure in one zone will result in the transmission of pressure effects through the soil to the other adjacent zone; and when the given pressures are created at two such adjacent zones simultaneously, or without a sufficient time interval between, the pressure effects emanating from such zones will combine and cooperate to produce, by their conjoint action, a general lifting of the soil thereabove, with resultant widening and non-localization of the pressure areas in a manner similar to that illustrated in Figure 2. Figure 2 illustrates what happens when slurry is introduced through the holes 7, 8, 9, 10 and 11 simultaneously, or without a sufficient time interval between the introductions of slurry to any two adjacent zones whose spheres of pressure influence are normally interactive.

Under such conditions the pressure areas or zones of influence of the fluid masses 11, 12, 13, and 14 have not been localized, and the effect is a general lifting of the earth surface from the normal surface line designated 1 to the raised line designated 40. This causes spreading of the fluid masses until they have joined, thus permitting a widening of the pressure area with consequent reduction in pressure and failure to produce the desired higher pressures at the respective zones of introduction of the cementitious fluid material. The desired soil stabilization effect proposed to be obtained by means of my invention is not obtained under the conditions illustrated by Figures 1 and 2.

Figure 3 illustrates a condition in which holes 17, 18, 19, 20 and 21, drilled in the earth to the same depth and in relatively close spaced relation, like in Figure 2, have been provided for the introduction of fluid masses 22, 23, 24, 25, and 26, the latter fluid masses, however, having been introduced, in accordance with the methods of my invention, in such a manner as to prevent the undesired conjoint action of the pressure effects emanating from the fluid masses introduced to adjacent zones and in such a manner as to produce localized zones or areas of pressures which serve to compact the soil and drive out moisture therefrom, to produce the desired stabilizing effect without lifting of the soil at the surface, the normal surface line, as indicated by the numeral 1, having been maintained as it was prior to the commencement of the pumping operation.

It will be assumed that the soil conditions illustrated in Figure 3 are the same as those illustrated in Figure 2, such that the bottom extremities of adjacent holes such as 17 and 18, or 18 and 19, or 19 and 20, or 20 and 21, are in adjacent zones whose spheres of pressure influence are normally interactive; that is to say, if slurry were introduced through adjacent holes such as 17 and 18 simultaneously, or without a predetermined time interval therebetween, and the pumping were continued long enough to introduce sufficient material into the soil to produce the desired pressure effect upon the soil in the zones 22 and 23, the pressure effects of the masses of material introduced at those zones would combine or cooperate to produce, by their conjoint action, a condition such as indicated in Figure 2, namely, a general lifting of the soil at the earth surface with resultant widening of the pressure area in the soil and reduction of pressure thereat.

Since my purpose is to build up localized pressure zones or areas represented by the numerals 22, 23, 24, 25 and 26, having pressures greater than the pressures exerted by the soil above said zones, I proceed, in accordance with my invention, to introduce the cementitious fluid mixture or slurry into only one of adjacent areas of the soil which are in zones whose spheres of influence are normally interactive, and I proceed to pump into such area of the soil a certain quantity of the cementitious fluid mixture or slurry which is sufficient to build up the desired pressure in the zone of the soil at which it is introduced, without resulting in a material lifting of the soil at the earth surface thereabove, and I allow a suitable time interval to elapse during which the cementitious fluid mixture, so introduced to the soil, may set, or harden, or solidify to a degree such that it will no longer move through the soil, before proceeding to introduce the cementitious fluid mixture or slurry at an adjacent area or zone in the soil whose sphere of pressure influence is normally interactive with the sphere of pressure influence of the first area to which slurry was introduced. The time interval between the introductions of cementitious material at such adjacent zones is sufficient to permit further compaction effect of said material upon the adjacent soil.

For example, I introduce the cementitious fluid material or slurry through the hole 17 into the area of the soil indicated by the numeral 22, introducing at that area only such amount of said material as is sufficient to produce a pressure zone 22 having a greater pressure than the pressure exerted by the weight of soil thereabove. The limit of the quantity of material which may be introduced at the zone 22 is reached and determined by the quantity of material introduced to that zone 22 which will just commence to cause slight bulging of the soil at the earth surface 1 above said zone, because as soon as the quantity of material introduced at the zone 22 is sufficient to raise the soil at the earth surface thereabove to any material degree, the result would be a widening out of the pressure zone 22 after the manner indicated in Figures 1 and 2, with resultant reduction in pressure at the zone 22.

After the introduction of a quantity of material at the zone 22 in accordance with the formula just defined, a given time interval will be permitted to elapse before the introduction of material into the soil at an adjacent area or zone 23, whose sphere of pressure influence is normally interactive with the sphere of pressure influence of the zone 22. The time interval just mentioned will be sufficient to permit the cementitious material introduced into the zone 22 to set up, or harden, or solidify to a degree such that the material introduced at the zone 22 will no longer flow through the soil. During this time interval the compaction effect of the cementitious material upon the adjacent soil and the driving or squeezing of moisture therefrom will continue after pumping is discontinued, sometimes for several days, due in part to the slow movement of moisture through the soil. The time interval will preferably be sufficiently long to obtain the optimum stabilization effect from the mass of material introduced at the zone 22, and the period of this time interval may therefore extend beyond the time required merely for the cementitious material to set up or harden to such an extent that it will no longer flow through the soil.

After the elapse of such time interval, a given quantity of the cementitious fluid mixture or slurry may be introduced through the hole 18 into the zone 23, the quantity of material introduced to the zone 23 being determined after the manner of determination of the quantity of material introduced at the zone 22, the upper limit of the quantity of material to be introduced at the zone 23 being such as will just commence to cause slight bulging of the soil at the earth surface above said zone.

In like manner, after suitable time interval for the setting up of the material introduced at the zone 23, and for further compaction effect of said material upon the adjacent soil, a similarly determined quantity of material may be introduced at the adjacent zone 24, and in a similar manner after suitable time intervals similarly determined quantities of material may be introduced at the zones 25 and 26.

By the practice of the method of my invention with reference to the introduction of cementitious material into the soil at adjacent zones whose spheres of pressure influence are normally interactive, I have found that it is possible to introduce greater quantities of material at each respective zone without a resultant lifting of the soil at the earth's surface thereabove. The reason for this seems to be that the introduction of the material at one only of said adjacent zones such as 22 and 23 serves to compact the soil adjacent said material and squeeze the moisture out of the soil surrounding the same. After the pumping of material to one of such adjacent zones 32 and 33 has been discontinued and the material is allowed to set up, the compaction of adjacent soil and the squeezing of moisture therefrom continues sometimes for as much as several days, this being in part due to the slow movement of moisture through the soil. Therefore, when slurry is subsequently introduced after the predetermined time integral into the next adjacent zone in the soil, the soil surrounding the material introduced at the first zone has been greatly compacted and stabilized so that the material introduced at the second adjacent zone does not readily flow through the soil, and is thus inhibited from spreading out or widening the pressure area, with consequent reduction of pressure, but serves, rather, to further compact the adjacent soil. The stabilizing effect created by the mass of material at the first of the adjacent zones through compaction of the surrounding soil and squeezing of moisture therefrom enables a higher pressure to be built up in the second adjacent zone through the introduction of a larger quantity of slurry thereto than would have been the case were the slurry introduced to the two adjacent zones simultaneously or without a sufficient time interval therebetween.

There are several methods that may be used for determining the quantities of material that may be introduced into the soil at the zones 22, 23, 24, 25, and 26 to produce the localized high pressure zones, above described, thereat. The following methods are exemplary. One method is to continue the pumping of the material into the soil until there is some slight indication of bulging of the earth surface above the zone of introduction, or until slight leakage of the cementitious fluid mixture being pumped has seeped through the soil and shows at some point of the surface. Another method is to pump a predetermined measured quantity of the cementitious fluid mixture or slurry at each location, said predetermined quantity being determined by tests and being a quantity less than that required to produce an appreciable bulging of the earth surface above the zone of introduction, or to cause slight leakage of slurry to the earth surface.

Still another method of determining the quantity of slurry to be introduced at a particular zone of the soil comprises pumping the slurry into the soil until a predetermined minimum pumping pressure is reached as observed by means of a suitable pressure gauge provided for the determination of the pumping pressure in the conduit through which the slurry is pumped into the soil. The predetermined minimum pumping pressure at which pumping of the slurry into the soil should be discontinued may likewise be determined by tests. When pumping is started at a new location, relatively high pumping pressures will be indicated by the pressure gauge, and as more material is introduced into the soil there will be a gradual drop in pressure until there is an appreciable bulge at the earth surface above the zone of introduction of the material into the soil, or until the material being pumped into the soil shows at some opening on the surface, at which time there will be an abrupt drop in the pumping pressure at the time of the appearance of the surface bulge, or the appearance of slurry at the earth surface through a leak in the soil. Thus, by suitable testing of the area of soil which is desired to be stabilized, the minimum pumping pressure at which pumping of material into the soil should be discontinued can be determined and this minimum pumping pressure will be a pressure slightly higher than than at which an abrupt drop of pumping pressure occurs when a bulging at the surface, or leak at the surface above the area of introduction of the slurry, appears. The minimum pumping pressure will vary depending on the soil conditions and depth below the earth surface at which the cementitious fluid mixture or slurry is introduced into the soil. Once the appropriate minimum pumping pressure has been determined by suitable test, however, the procedure in accordance with my invention where a pressure gauge is associated with the conduit will be to continue the pumping of the slurry into the soil until the predetermined minimum pressure is reached as observed upon the pressure gauge.

For the purposes of the procedure just described, as shown in Figure 7, there may be provided a pressure gauge A4 suitably associated with the conduit A3 through which the slurry is pumped into the hollow stem A1 of the nozzle unit A.

Now referring to Figure 4, there is illustrated the method, in accordance with my invention, of introducing a cementitious fluid mixture or slurry into the soil at a plurality of zones simultaneously where certain adjacent zones desired to be pressurized are zones whose spheres of pressure influence are normally interactive, the method illustrated by Figure 4 preventing the undesired conjoint action of pressure effects resulting from the fluid masses introduced at adjacent regions of the soil while said masses of material introduced at any two adjacent zones are both in fluid state. As shown in Figure 4, a plurality of holes 27, 28, 29, 30, and 31 are drilled in the earth through the soil 2, and through these holes the cementitious fluid mixture or slurry is introduced into the soil as indicated at 32, 33, 34, 35, and 36, to provide corresponding localized pressure zones of higher pressure than that of the weight of the soil above the same. However, the conditions of the soil are, as in Figures 2 and 3, such that the bottom extremities of the adjacent holes such as 27 and 28, or 28 and 29, or 29 and 30, or 30 and 31, are in adjacent zones whose spheres of pressure influence are normally interactive.

The method of procedure for introducing material into the soil in a plurality of locations simultaneously, as illustrated in Figure 4, is as follows: Slurry is introduced simultaneously through the holes 27 and 31 leading to zones 32 and 36 which are sufficiently spaced apart so that their spheres of pressure influence are not normally interactive. Pumping of the slurry into the zones 32 and 36 is continued until the maximum quantities of material, determined as previously indicated, have been introduced into those zones. Now a predetermined time interval, as above described, is allowed to elapse, after the discontinuance of pumping at the zones 32 and 36, during which interval the material introduced at those zones will set up, or harden, or solidify to a degree such that the material will no longer flow through the soil, and during which interval the compaction effect upon the adjacent soil and the driving or squeezing of moisture therefrom will continue.

After the predetermined time interval has elapsed, the slurry may be introduced through the hole 29 into the zone 34 whose sphere of pressure influence may or may not be normally interactive with the sphere of pressure influence of either zone 32 or 36, and which zone 34 is intermediate the zones 32 and 36, until the desired quantity of material has been introduced to said zone 34, the proper quantity being determined in accordance with procedure hereinabove outlined. After the pumping of material to the zone 34 has been discontinued, another suitable time interval, as above described, will be allowed to elapse, during which the material in the zone 34 will set up and during which further stabilization effect upon the surrounding soil will take place. After the elapse of the predetermined time interval after the discontinuance of pumping of slurry to the zone 34, slurry may be introduced through the holes 28 and 30 to the zones 33 and 35 which are intermediate zones 32 and 34, and 34 and 36, for a third pumping operation as indicated in Figure 4.

From the foregoing it will be apparent that the method of procedure illustrated by Figure 4 involves a series of pumping operations, the first pumping operation involving introduction of cementitious material simultaneously into the soil at zones sufficiently spaced apart that their spheres of pressure influence are not normally interactive, and each successive pumping operation involving the introduction of said material into the soil at zones which are intermediate the zones at which said material has been previously introduced, certain of the successive pumping operations, if desired, involving introduction of said material at a zone or zones whose spheres of pressure influence are not normally interactive with zones at which said material has been introduced in a previous pumping operation, a time interval being allowed between each pumping operation for setting of material introduced in that operation and for further compaction effect of said material upon the adjacent soil.

As indicated in Figure 5, localized pressure areas may be produced at various depths in the soil for extending the consolidating influence over a greater thickness of soil section, and, to extend the influence over any desired area, fluid material may be introduced at points spaced in a somewhat uniform pattern as indicated in Figure 6.

For example, slurry may be introduced into the soil through holes 40, 41 and 42 to the zones 43, 44 and 45 at substantially the same depth, and through holes 46 and 47 to zones 48 and 49 at greater depth, and through holes 50 and 51 to zones 52 and 53 at a lesser depth. Slurry will not, of course, be introduced simultaneously or without a suitable time interval, to any two or more of such zones whose spheres of pressure influence are normally interactive, and the procedures of my invention, previously described, will be followed to create the localized pressure zones 43, 44, 45, 48, 49, 52 and 53.

Having thus described by invention, what I claim as new and desire to secure by Letters Patent of the United States, is:

1. The method of producing stability in soil masses which comprises introducing cementitious material in fluid condition under pressure simultaneously into the soil below the earth surface at zones spaced apart a sufficient distance that their spheres of pressure influence are not normally interactive, allowing the material so introduced to set, and then introducing said material under pressure into the soil at a zone intermediate said first zones which is effective upon said first zones.

2. The method of producing stability in soil masses which comprises introducing cementitious material in fluid condition under pressure into the soil below the earth surface at zones spaced apart a sufficient distance that their spheres of pressure influence are not normally interactive, continuing the introduction of material at said zones until a quantity of material has been introduced at each zone approximating and not substantially greater than that required to cause slight bulging of the earth surface above the respective zones, or leakage of material to the earth surface, allowing the material to set during a period in which further compaction effect upon the soil adjacent each zone takes place, and then introducing said material under pressure into the soil at a zone intermediate the first mentioned zones and effective therewith in a quantity approximating and not substantially greater than that required to cause slight bulging of the earth surface above said intermediate zone or leakage of said material to the earth surface.

JOHN W. POULTER.

REFERENCES CITED

The following references are of record in the file of this patent:

UNITED STATES PATENTS

| Number | Name | Date |
|---|---|---|
| 849,043 | Bradt | Apr. 2, 1907 |
| 1,009,159 | Lodwick | Nov. 21, 1911 |
| 1,915,032 | Poulter | June 20, 1933 |
| 1,943,914 | Fiock | Jan. 16, 1934 |
| 2,363,018 | Poulter | Nov. 21, 1944 |